(12) United States Patent
Comeau

(10) Patent No.: US 8,016,525 B2
(45) Date of Patent: Sep. 13, 2011

(54) DUNNAGE HOLDER

(76) Inventor: Timothy Comeau, Calgary (CA)

( * ) Notice: Subject to any disclaimer, the term of this patent is extended or adjusted under 35 U.S.C. 154(b) by 227 days.

(21) Appl. No.: 12/510,293

(22) Filed: Jul. 28, 2009

(65) Prior Publication Data

US 2011/0027033 A1 Feb. 3, 2011

(51) Int. Cl.
*B60P 7/08* (2006.01)

(52) U.S. Cl. .......... 410/49; 410/121; 410/152; 410/143; 410/155; 410/89

(58) Field of Classification Search ............ 410/121, 410/143, 152, 155, 30, 140, 89, 49; 188/4 R; 224/322, 402, 42.33; 296/43; 248/351
See application file for complete search history.

(56) References Cited

U.S. PATENT DOCUMENTS

| | | | |
|---|---|---|---|
| 2,593,174 A | 4/1952 | O'Dell | |
| 4,502,619 A | 3/1985 | Cox | |
| 5,833,412 A | 11/1998 | Valencia et al. | |
| 6,193,260 B1 | 2/2001 | Homan et al. | |
| 7,503,738 B1 | 3/2009 | Doyle | |
| 2004/0115021 A1* | 6/2004 | Carmichael | 410/121 |

FOREIGN PATENT DOCUMENTS

GB 1359709 7/1974

* cited by examiner

*Primary Examiner* — Stephen Gordon
(74) *Attorney, Agent, or Firm* — Maxey Law Offices, PLLC; Stephen Lewellyn

(57) ABSTRACT

A dunnage holder for securing and positioning a freight bracing beam spanning across the width of a flatbed trailer has a vertically oriented stake member adapted for insertion into a stake hole of the flatbed of the trailer. A horizontally oriented arm is cooperative with the stake member for reciprocation along a direction that is transverse to the stake member. A corner pocket is fixedly attached to the arm for relative movement with the arm and has an opening sufficiently large to receive an end of a load bracing beam extending across the width of the flatbed trailer and transversely to the arm. An arm position locking pin is removably insertable through cooperating holes of the arm and the stake member, wherein the arm is locked in position relative to the stake member when the arm positioning locking pin is inserted through the cooperating holes.

5 Claims, 4 Drawing Sheets

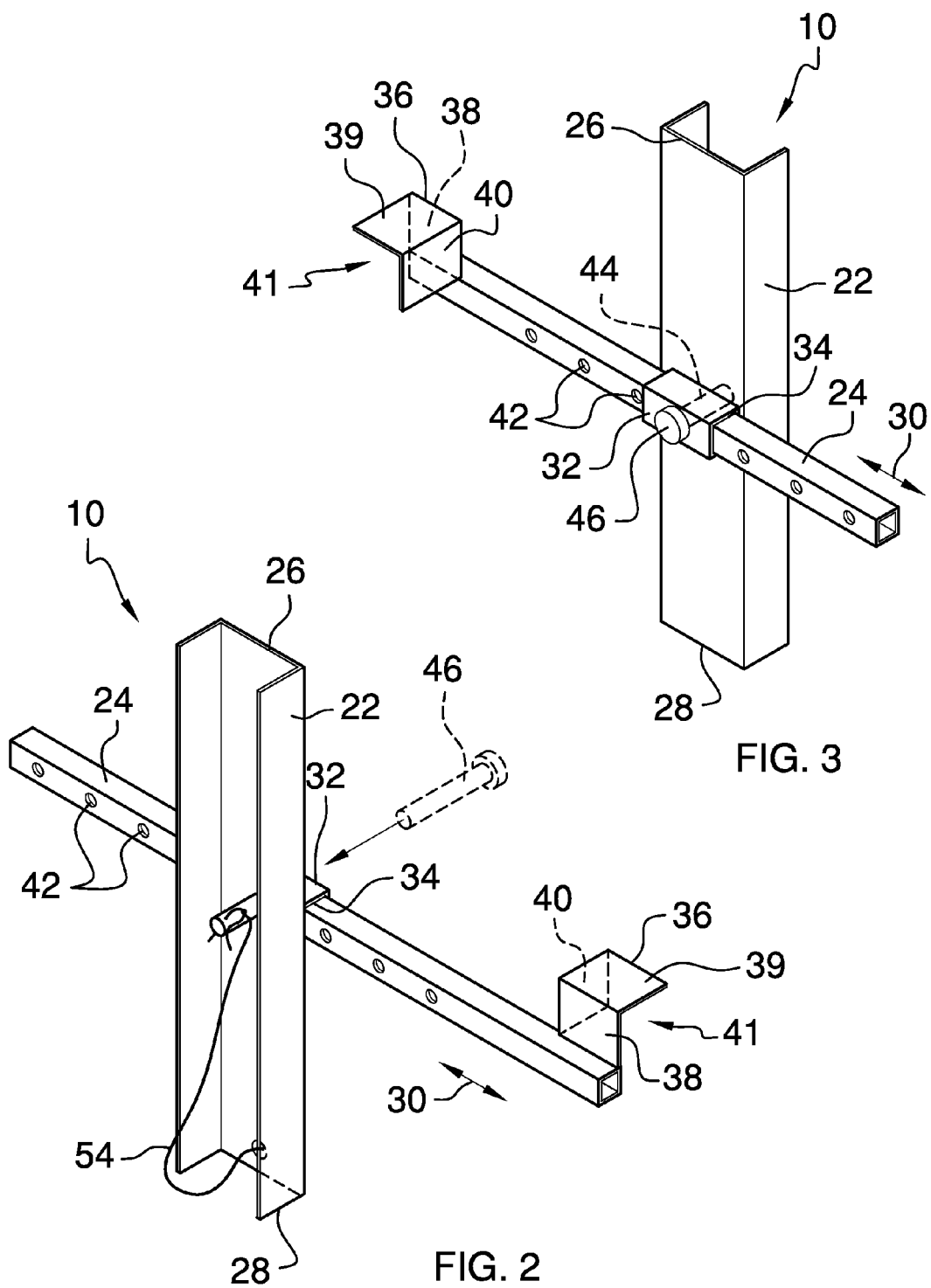

DUNNAGE HOLDER

FILED OF THE INVENTION

The present invention relates generally to securing loads for transport on a flatbed of a trailer, and more particularly, relating to a dunnage holder for positioning and holding a load bracing beam spanning across a flatbed of a trailer.

BACKGROUND OF THE INVENTION

Freight, and particularly oversized freight is routinely transported on a flatbed trailer. The freight can be heavy, awkward and difficult to move and position on the flatbed. Once the freight is positioned on the flatbed, it is desirable to secure the freight against movement such that it does not shift when the trailer is in motion. It is therefore desirable to provide a dunnage holder for positioning and securing a brace beam spanning across the width of the flatbed to aid in securing the freight against movement. It is particularly desirable to provide a dunnage holder that is capable of adjusting to accommodate the position of the freight on the flatbed, as opposed to adjusting the position of the freight to accommodate the dunnage holder.

SUMMARY OF THE INVENTION

The preferred embodiments of the present invention addresses this need by providing a dunnage holder for positioning and securing a load bracing beam spanning across the width of a flatbed that is adjustable from its attachment location on the flatbed to receive the ends of the bracing beam.

To achieve these and other advantages, in general, in one aspect, dunnage holder for positioning and holding an end of a load bracing beam spanning across a flatbed of a trailer is provided. The dunnage holder includes a vertically oriented stake member adapted for insertion into a stake hole of a flatbed trailer. A horizontally oriented arm is cooperative with the stake member for reciprocation along a direction that is transverse to the stake member. A corner pocket is fixedly attached to the arm for relative movement with the arm and has an opening sufficiently large to receive an end of a load bracing beam extending across the width of the flatbed trailer and transversely to the arm. An arm position locking pin is removably insertable through cooperating holes of the arm and the stake member, wherein the arm is locked in position relative to the stake member when the arm positioning locking pin is inserted through the cooperating holes.

There has thus been outlined, rather broadly, the more important features of the invention in order that the detailed description thereof that follows may be better understood and in order that the present contribution to the art may be better appreciated.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The accompanying drawings, which are included to provide further understanding of the invention and are incorporated in and constitute a part of this specification, illustrate preferred embodiments of the invention and together with the description serve to explain the principles of the invention, in which:

FIG. 2 is a rear perspective view of the dunnage holder;

FIG. 3 is a front perspective view of the dunnage holder;

Similar reference characters denote corresponding features consistently throughout the figures of the drawings.

DETAILED DESCRIPTION OF THE INVENTION

Figure 1:
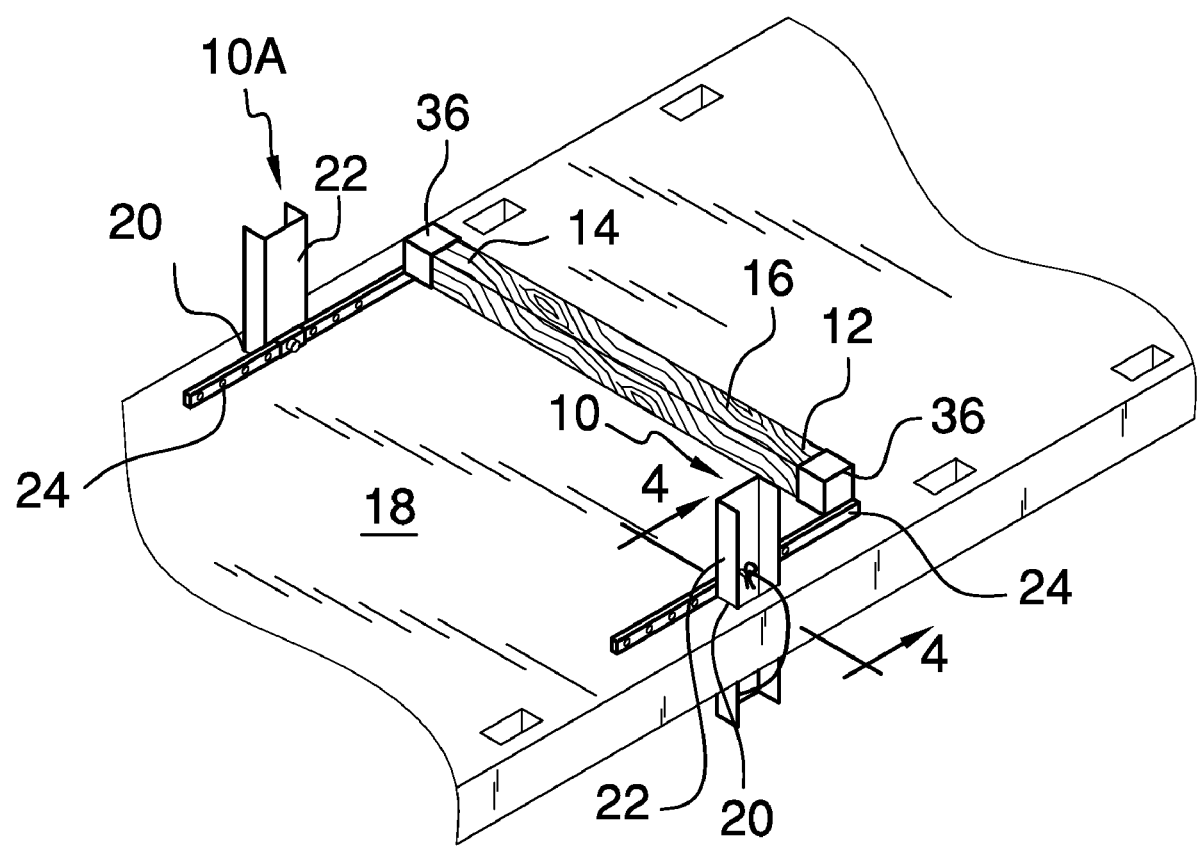
FIG. 1 is a perspective environment view of a partial flatbed trailer and a pair of opposite and corresponding dunnage holders, constructed in accordance with the invention, located within a pair of opposite and corresponding stake holes and positioning and securing a load bracing beam spanning across the width of the flatbed.

Reference will now be made in detail to the preferred embodiments of the present invention, examples of which are illustrated in the accompanying drawings. Referring initially to FIG. 1 there is shown an environmental view of a pair of corresponding and oppositely positioned dunnage holders 10 and 10A of the invention in use and holding opposite ends 12 and 14 of a load bracing beam 16 spanning across a flatbed 18 of a trailer. Dunnage holders 10 and 10A are positioned within in a pair of corresponding and oppositely located stake holes 20 of the flatbed 18. Dunnage holders 10 and 10A are similarly constructed, and accordingly the following description is made in reference to a single holder. Specific reference to dunnage holder 10 and 10A where appropriate is made, and same reference numbers refer to similar elements.

Dunnage holder 10 is particularly useful in shoring up heavy and awkward to move loads, for example a section of concrete pipe, supported on a flatbed of a trailer through the adjustable positioning and holding of a bracing beam across the flatbed, as will become readily apparent from the following description.

With reference to FIGS. 2 and 3, there is shown rear and front perspective views, respectively, of dunnage holder 10. Dunnage holder 10 comprises a vertically oriented stake member 22 adapted for insertion into a stake hole 20 (as best seen in FIG. 1). The stake member 22 comprises a steel C-shaped channel section. Alternatively, the stake member 22 could be of a rectangular shaped hollow tube section or of a rectangular shaped solid bar section.

A horizontally oriented arm 24 is cooperative with stake member 22 for sliding along a path transverse to stake member as indicated by arrow 30, i.e. longitudinally along the flatbed 18 while the stake member inserted into a stake pocket. In one example, the arm 24 is of an elongated hollow rectangular shaped tube and is slidingly attached to the stake member 22 at a vertical location between ends 26 and 28 of the stake member for reciprocation along a direction that is transverse to the stake member. Arm 24 is slidable through a horizontally oriented passage 34 (FIG. 4) provided by tube 32 that is fixedly attached to or integral with stake member 22. Alternative constructions are possible, for example, arm 24 could be an elongated solid or hollow member of various cross-sectional shapes. Likewise, arm 24 could be sliding attached to stake member 22 with various alternative constructions.

Affixed at one end of arm 24 is a corner pocket 36 formed of two vertical sidewalls 38 and 40, and a top wall 39 creating an opening 41 therein for receiving an end of a piece of dunnage or bracing beam, such as a 4-inch by 4-inch beam. The pocket 36 is arranged with sidewall 38 parallel to arm 24 and extending generally vertically upward therefrom, and with sidewall 40 transverse to arm 24. To this end, an end of a bracing beam is essentially captured by and between corner pocket 36 and the flatbed 18 of a trailer with an outward facing open end into which the bracing beam can be inserted.

Arm 24 has a plurality of longitudinally spaced holes 42 extending therethrough for cooperating alignment with through hole 44 extending through the stake member 22. A single hole 42 at a time can be positioned in cooperative alignment with hole 44 of the stake member 22 by sliding the arm transversely to the stake member. Arm position locking pin 46 is removably insertable through cooperatively aligned holes 42 and hole 44 to secure the horizontal position of arm 24 relative to the stake member 22.

Figure 4:
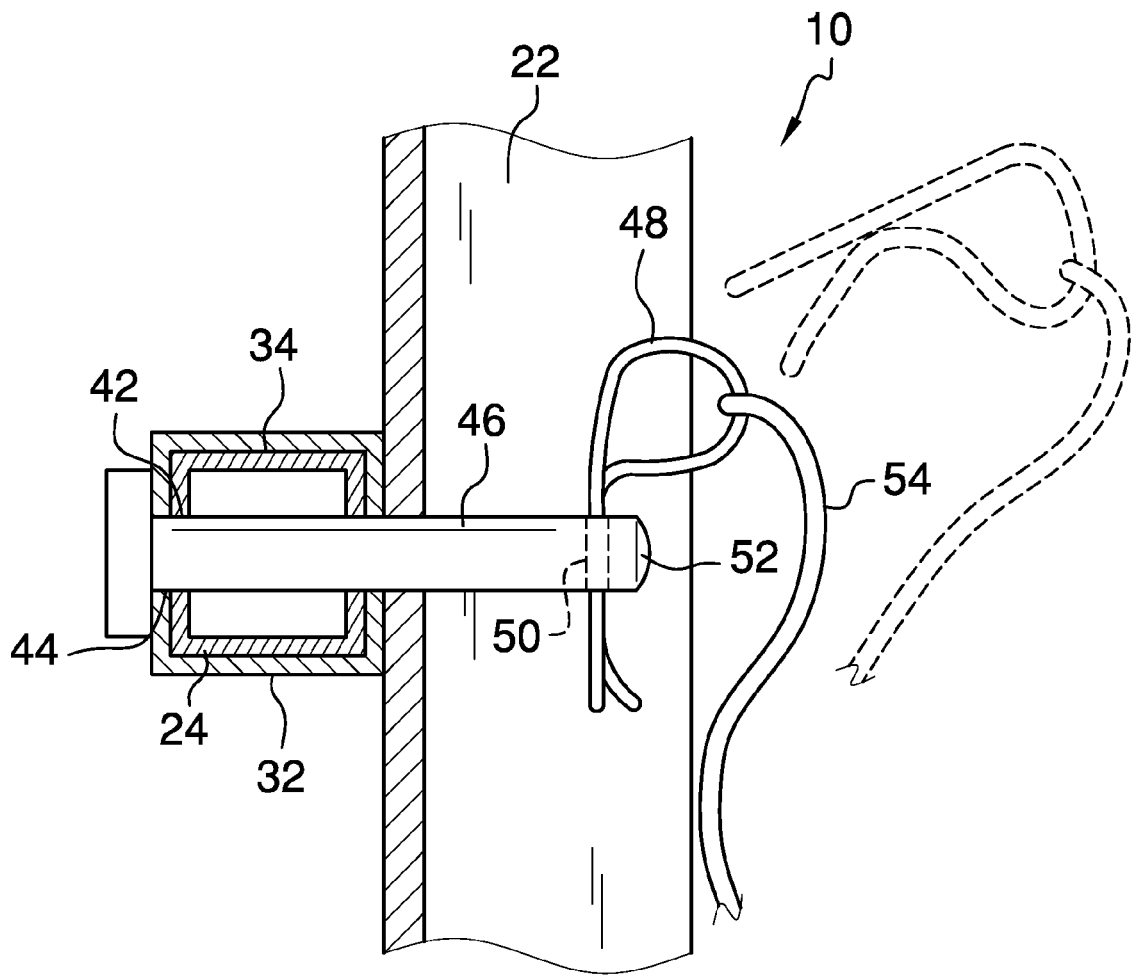
FIG. 4 is an enlarge, partial cross-sectional view taken along line 4-4 in FIG. 1.

In FIG. 4 there is shown a partial cross-section through the arm 24 and stake member 22. Arm 24 is located in horizontal passage 34 of tube 32. Arm positioning locking pin 46 is inserted through holes 42 and 44, thereby securing the horizontal position of arm 24 relative to stake member 22. A clasp 48 secures arm positioning locking pin 46 from being withdrawn from holes 42 and 44. Clasp 48 can be of the cotter pin type that is insertable through a hole 50 through end 52 of the arm positioning locking pin 46. As shown in FIGS. 1 and 2, an optional flexible tether 54 can connect the clasp to the stake member 22 about end 28 thereof. To this end, the tether 54 prevents the clasp 48 from being lost, and also serves to secure and prevent withdrawal of the stake member 22 from the stake hole 20 by wrapping around the outer edge of the flatbed 18 when the clasp 48 is attached to locking pin 46, as best seen in FIG. 1.

Figure 5:
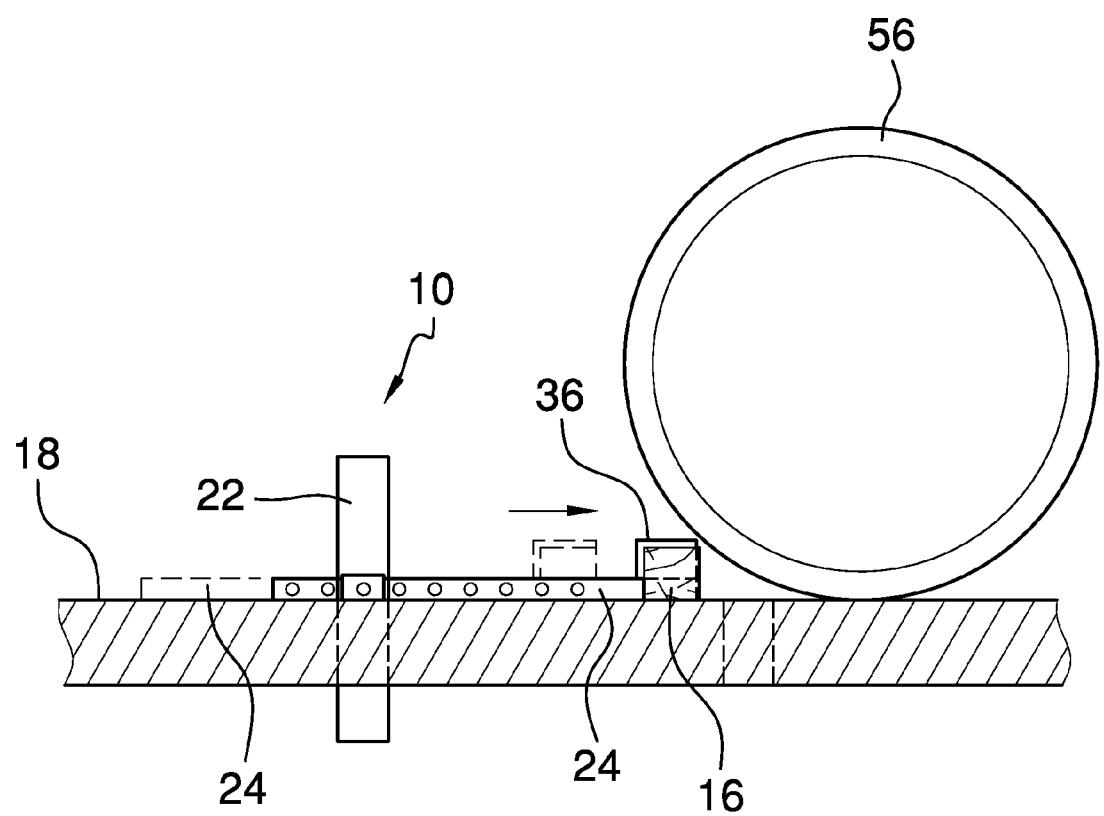
FIG. 5 is a side elevation view of the dunnage holder in use.

With reference to FIG. 5, the dunnage holder 10 is shown being adjusted to properly position and hold a bracing beam against a load 56 positioned on the flatbed 18 of a trailer. Here the load 56 is shown as a large concrete pipe typically used in a storm water system. It can be appreciated the load 56 is awkward and difficult to position on the flatbed. In prior dunnage securing systems using the stake holes of the flatbed the load needs to be positioned on the flatbed against a fixedly and non-movably held bracing beam. Positioning the load in this manner is very time consuming and difficult. Whereas in the invention herein, the load 56 is positioned on and across the flatbed 18 in general proximity to a pair of opposite and corresponding stake holes 20. Corresponding dunnage holders 10 and 10A (not shown) are positioned in the corresponding stake holes 20, bracing beam is positioned against the load 56, and the arms 24 of each dunnage holder is adjusted to receive corresponding ends of the bracing beam in the corner pocket thereof, respectively.

A number of embodiments of the present invention have been described. Nevertheless, it will be understood that various modifications may be made without departing from the spirit and scope of the invention. Accordingly, other embodiments are within the scope of the following claims.

What is claimed is:

1. A dunnage holder for positioning and holding an end of a load bracing beam spanning across a flatbed of a trailer, the dunnage holder comprising:
    a vertically oriented stake member adapted for insertion into a stake hole of a flatbed trailer;
    a horizontally oriented arm cooperative with said stake member for reciprocation along a direction that is transverse to said stake member;
    a corner pocket fixedly attached to said arm for relative movement with said arm, said corner pocket having an opening sufficiently large to receive an end of a load bracing beam extending across a width of the flatbed trailer and transversely to said arm; and
    an arm position locking pin removably insertable through cooperating holes of said arm and said stake member, wherein said arm is locked in position relative to said stake member when said arm position locking pin is inserted through said cooperating holes.

2. The dunnage holder of claim 1, further comprising:
    a clasp insertable through an end of said arm position locking pin to prevent withdrawal of said arm position locking pin from said cooperating holes; and
    a flexible tether connecting said clasp to said stake member approximate a bottom thereof.

3. The dunnage holder of claim 1, further comprising:
    a horizontally oriented passage across said stake member through which said arm is slidable.

4. The dunnage holder of claim 3, wherein said horizontally oriented passage is provided by a hollow tube.

5. A load bracing beam and dunnage holder assembly, comprising:
    a flatbed of a trailer having corresponding and oppositely located stake holes;
    a load bracing beam spanning across said flatbed and having opposed ends, said load bracing beam being secured at said oppssed ends thereof by a pair of corresponding and oppositely positioned dunnage holders, each holder positioned in a corresponding and oppositely located one of said holes; and
    each of said dunnage holders comprising a vertically oriented stake member adapted for insertion into a stake hole of the flatbed trailer, a horizontally oriented arm slidingly attached to said stake member for reciprocation along a direction that is transverse to said stake member, a corner pocket fixedly attached to said arm for relative movement with said arm, said corner pocket having an opening sufficiently large to receive an end of a load bracing beam extending across a width of the flatbed trailer and transversely to said arm, and an arm position locking pin removably insertable through cooperating holes of said arm and said stake member, wherein said arm is locked in position relative to said stake member when said arm position locking pin is inserted through said cooperating holes.

\* \* \* \* \*